US008688090B2

(12) United States Patent
Dillahunt et al.

(10) Patent No.: US 8,688,090 B2
(45) Date of Patent: Apr. 1, 2014

(54) DATA SESSION PREFERENCES

(75) Inventors: Tawanna R. Dillahunt, Pittsburgh, PA (US); Jason B. Ellis, New York, NY (US); Robert G. Farrell, Cornwall, NY (US)

(73) Assignee: International Business Machines Corporation, Armonk, NY (US)

( * ) Notice: Subject to any disclaimer, the term of this patent is extended or adjusted under 35 U.S.C. 154(b) by 445 days.

(21) Appl. No.: 13/052,508

(22) Filed: Mar. 21, 2011

(65) Prior Publication Data
US 2012/0244843 A1 Sep. 27, 2012

(51) Int. Cl.
*H04L 29/06* (2006.01)

(52) U.S. Cl.
USPC ............... 455/414.3; 455/432.3; 455/514

(58) Field of Classification Search
USPC .................... 455/414.3, 432.3, 514
See application file for complete search history.

(56) References Cited

U.S. PATENT DOCUMENTS

| | | | |
|---|---|---|---|
| 1,191,425 A | 7/1916 | Huddle | |
| 4,592,085 A | 5/1986 | Watari et al. | |
| 5,390,278 A | 2/1995 | Gupta et al. | |
| 5,422,916 A | 6/1995 | Nall | |
| 6,718,368 B1 | 4/2004 | Ayyadurai | |
| 6,834,270 B1 | 12/2004 | Pagani et al. | |
| 6,879,257 B2 | 4/2005 | Hisano et al. | |
| 7,003,570 B2 | 2/2006 | Messinger et al. | |
| 7,047,027 B2 | 5/2006 | Jeon | |
| 7,151,490 B2 | 12/2006 | Richards | |
| 7,163,151 B2 | 1/2007 | Kiiskinen | |
| 7,177,795 B1 | 2/2007 | Chen et al. | |
| 7,209,949 B2 | 4/2007 | Mousseau et al. | |
| 7,228,228 B2 | 6/2007 | Bartlett et al. | |
| 7,263,597 B2 | 8/2007 | Everdell et al. | |
| 7,266,754 B2 | 9/2007 | Shah et al. | |
| 7,337,115 B2 | 2/2008 | Liu et al. | |
| 7,512,659 B2 | 3/2009 | Keohane et al. | |
| 7,551,935 B2 | 6/2009 | Karmakar | |
| 7,634,528 B2 | 12/2009 | Horvitz et al. | |
| 7,650,376 B1 * | 1/2010 | Blumenau ............... 709/203 |
| 7,693,945 B1 | 4/2010 | Dulitz et al. | |
| 7,729,689 B2 | 6/2010 | Chakraborty et al. | |

(Continued)

FOREIGN PATENT DOCUMENTS

| CA | 2493180 A1 | 7/2005 |
|---|---|---|
| EP | 1340096 A1 | 9/2003 |

(Continued)

OTHER PUBLICATIONS

Blackwell T., "Fast Decoding of Tagged Message Formats," Proceeding IEEE INFOCOM '96, Mar. 24-28, 1996, Copyright 1996 IEEE, pp. 224-231.

(Continued)

*Primary Examiner* — Kwasi Karikari
(74) *Attorney, Agent, or Firm* — Cantor Colburn LLP; Preston Young (57) ABSTRACT

A method includes receiving a request from a user device for a service, initializing the service, initializing a user preference based on a parameter associated with the service and a preference probability value, the preference probability value including a probability that a user would prefer a particular value as a preference based on values selected by other users, and sending data to the user device according to the user preference.

17 Claims, 8 Drawing Sheets

(56) References Cited

U.S. PATENT DOCUMENTS

| | | |
|---|---|---|
| 7,886,083 B2 | 2/2011 | Pinkerton et al. |
| 2002/0138582 A1 | 9/2002 | Chandra et al. |
| 2002/0165961 A1 | 11/2002 | Everdell et al. |
| 2003/0009385 A1 | 1/2003 | Tucciarone et al. |
| 2003/0031309 A1 | 2/2003 | Rupe et al. |
| 2003/0033394 A1 | 2/2003 | Stine |
| 2003/0115366 A1 | 6/2003 | Robinson |
| 2003/0120822 A1 | 6/2003 | Langrind et al. |
| 2003/0182421 A1 | 9/2003 | Faybishenko et al. |
| 2004/0019648 A1 | 1/2004 | Huynh et al. |
| 2004/0022264 A1 | 2/2004 | McCue |
| 2004/0024817 A1 | 2/2004 | Pinkas |
| 2004/0260551 A1 | 12/2004 | Atkin et al. |
| 2005/0010573 A1 | 1/2005 | Garg |
| 2005/0038660 A1 | 2/2005 | Black et al. |
| 2005/0060372 A1 | 3/2005 | DeBettencourt et al. |
| 2005/0060381 A1 | 3/2005 | Huynh et al. |
| 2005/0102625 A1 | 5/2005 | Lee et al. |
| 2005/0114357 A1 | 5/2005 | Chengalvarayan et al. |
| 2005/0171768 A1 | 8/2005 | Gierach |
| 2005/0192808 A1 | 9/2005 | Sugiyama |
| 2005/0198270 A1 | 9/2005 | Rusche et al. |
| 2006/0015339 A1 | 1/2006 | Charlesworth et al. |
| 2006/0036441 A1 | 2/2006 | Hirota |
| 2006/0155854 A1 | 7/2006 | Selgert |
| 2006/0287867 A1 | 12/2006 | Cheng et al. |
| 2007/0019793 A1 | 1/2007 | Cheng |
| 2007/0033229 A1 | 2/2007 | Fassett et al. |
| 2007/0078986 A1 | 4/2007 | Ethier et al. |
| 2007/0171066 A1 | 7/2007 | Fein et al. |
| 2007/0174326 A1 | 7/2007 | Schwartz et al. |
| 2007/0192422 A1 | 8/2007 | Stark et al. |
| 2007/0237135 A1 | 10/2007 | Trevallyn-Jones et al. |
| 2007/0290787 A1 | 12/2007 | Fiatal et al. |
| 2008/0004056 A1 | 1/2008 | Suzman |
| 2008/0057922 A1 | 3/2008 | Kokes et al. |
| 2008/0075433 A1 | 3/2008 | Gustafsson |
| 2008/0083024 A1 | 4/2008 | Glazer et al. |
| 2008/0091723 A1 | 4/2008 | Zuckerberg et al. |
| 2008/0155534 A1* | 6/2008 | Boss et al. ............... 717/178 |
| 2008/0159266 A1 | 7/2008 | Chen et al. |
| 2008/0162132 A1 | 7/2008 | Doulton |
| 2008/0233977 A1 | 9/2008 | Xu et al. |
| 2008/0233981 A1 | 9/2008 | Ismail |
| 2009/0012841 A1 | 1/2009 | Saft et al. |
| 2009/0031006 A1 | 1/2009 | Johnson |
| 2009/0037515 A1 | 2/2009 | Zapata et al. |
| 2009/0062949 A1 | 3/2009 | Heo et al. |
| 2009/0094190 A1 | 4/2009 | Stephens |
| 2009/0099906 A1 | 4/2009 | Kirley et al. |
| 2009/0125595 A1 | 5/2009 | Maes |
| 2009/0128335 A1 | 5/2009 | Leung |
| 2009/0131080 A1 | 5/2009 | Nadler et al. |
| 2009/0131087 A1 | 5/2009 | Johan |
| 2009/0150786 A1 | 6/2009 | Brown |
| 2009/0164287 A1 | 6/2009 | Kies et al. |
| 2009/0186641 A1 | 7/2009 | Vaananen |
| 2009/0191902 A1 | 7/2009 | Osborne |
| 2009/0199114 A1 | 8/2009 | Lewis et al. |
| 2009/0210226 A1 | 8/2009 | Ma |
| 2009/0216805 A1 | 8/2009 | Coffman et al. |
| 2009/0265631 A1 | 10/2009 | Sigurbjornsson |
| 2009/0270068 A1 | 10/2009 | Ahopelto et al. |
| 2009/0271380 A1 | 10/2009 | Julia et al. |
| 2009/0276488 A1 | 11/2009 | Alstad |
| 2010/0015956 A1 | 1/2010 | Qu et al. |
| 2010/0030578 A1 | 2/2010 | Siddique et al. |
| 2010/0048242 A1 | 2/2010 | Rhoads et al. |
| 2010/0049599 A1 | 2/2010 | Owen et al. |
| 2010/0087172 A1 | 4/2010 | Klassen et al. |
| 2010/0122331 A1 | 5/2010 | Wang et al. |
| 2010/0128335 A1 | 5/2010 | Maeda et al. |
| 2010/0174622 A1 | 7/2010 | Sohn et al. |
| 2010/0201845 A1 | 8/2010 | Feinberg et al. |
| 2010/0210248 A1 | 8/2010 | Morrissey et al. |
| 2010/0287197 A1 | 11/2010 | Wang et al. |
| 2010/0296646 A1 | 11/2010 | Hemm et al. |
| 2011/0021178 A1 | 1/2011 | Balasaygun et al. |
| 2011/0035284 A1 | 2/2011 | Moshfeghi |
| 2011/0061068 A1 | 3/2011 | Ali et al. |
| 2011/0072015 A1 | 3/2011 | Lin et al. |
| 2011/0145356 A1 | 6/2011 | Tanner |
| 2011/0153723 A1 | 6/2011 | Mutnuru et al. |
| 2011/0153839 A1 | 6/2011 | Rajan et al. |
| 2011/0212736 A1 | 9/2011 | Jaime et al. |
| 2011/0219018 A1 | 9/2011 | Bailey et al. |
| 2011/0231747 A1 | 9/2011 | Zuckerberg et al. |
| 2011/0246560 A1 | 10/2011 | Gibson |
| 2012/0134548 A1 | 5/2012 | Rhoads |
| 2013/0100301 A1 | 4/2013 | Rhoads |

FOREIGN PATENT DOCUMENTS

| | | |
|---|---|---|
| GB | 2396520 A | 6/2004 |
| GB | 2461730 A | 1/2010 |
| WO | 0241029 A1 | 5/2002 |
| WO | 2005025155 A1 | 3/2005 |
| WO | 2006127791 A2 | 11/2006 |
| WO | 2007086683 A1 | 8/2007 |
| WO | 2008026945 A1 | 3/2008 |
| WO | 2009012516 A1 | 1/2009 |
| WO | 2009135292 A1 | 11/2009 |

OTHER PUBLICATIONS

International Preliminary Report on Patentability for (1150010PCT and US1); for International Patent Application No. PCT/US2011/023557; International Filing Date: Feb. 3, 2011; 5 pages.

Best Shareware, "SoundPix Plus", http://www.bestshareware.net/download/soundpixplus.htm, retrieved from the internet on Jan. 12, 2012, 2 pages.

Dey, Anind K. et al., "CybreMinder: A Context Aware System for Supporting Reminders," HUC 2000, LNCS 1927, pp. 172-186, 2000.

Computerworld, "Facebook photo privacy PANIC: Auto-tag apology and apologia", http://blogs.computerworld.com/18435/facebook_photo_privacy_panic_auto_tag_apology_and_apologia, retrieved from the internet on Jan. 12, 2012, 7 pages.

Digital Photography School, "Columbus V-900 GPS Voice Photo Data Logger Review", http://www.digital-photography-school.com/columbus-v-900-gps-voice-photo-data-logger-review, retrieved from the internet on Jan. 12, 2012, 3 pages.

Google Image Labeler, http://en.wikipedia.org/wiki/Google_Image_Labeler, Aug. 31, 2006, 4 pages.

Mobile Phones "Nokia patents voice tagging of hotos", http://www.mobilephones.org.uk/nokia/nokia-patents-voice-tagging-of-photos/, retrieved from the internet on Apr. 12, 2012, 4 pages.

resco.net Developer & Mobile Enterprise, "How to use mobile devices camera and microphone in business applications", http://www.resco.net/developer/company/articles.aspx?file=articles/article14, retrieved from the internet on Jan. 12, 2012, 6 pages.

"Sentiment140", http://help.sentiment140.com/, retrieved from Internet May 8, 2012, 2 pages.

The Stanford Natural Language Processing Group, "Stanford Log-linear Part-Of_Speech Tagger", http://npl.stanford.edu/software/tagger.shtml, retrieved from the internet on Apr. 11, 2012, 3 pages.

IBM et al., "Apparatus For Sending a Sequence of Asynchronous Messages Through the Same Channel in a Messaging Middleware Cluster," Published Oct. 4, 2005, Copyright IP.com, Inc., pp. 1-7.

Anind K. Dey and Gregory D. Abowd, "CybreMinder: A Context Aware System for Supporting Reminders," HUC 2000, LNCS 1927, pp. 172-186, 2000.

ACM Digital Library, [online]; [retrieved on Mar. 14, 2011]; retrieved from the Internet http://portal.acm.org/citation.cfm?id=1670452 Alberto Gonzalez Prieto et al.,"Adaptive Performance Management for SMS Systems," Journal of Network and Systems Management; vol. 17 Issue 4, Dec. 2009.

NMS Adaptive, [online]; [retrieved on Mar. 14, 2011]; retrieved from the Internet http://www.nms-adaptive.com/products/pages/desktop-sms-frameset.htm.

(56) References Cited

OTHER PUBLICATIONS

Carnegie Mellon University, [online]; [retrieved on Mar. 14, 2011]; retrieved from the Internet http://citeseerx.ist.psu.edu/viewdoc/download?doi=10.1.1.70.4047&rep=rep1&type=pdf Daniel Siewiorek et al.,"SenSay: A Context-Aware Mobile Phone," 2003.

The Symbian Blog [online]; [retrieved on Mar. 15, 2011]; retrieved from the Internet http://www.symbianzone.co.cc/2010/08/sms-tag-v10-sms-organizer-symbian-os-94.html Symbian SMS Tag Organizer; 2010.

AdaptiveMobile [online]; [retrieved on Mar. 15, 2011]; retrieved from the Internet http://www.adaptivemobile.com 2011.

V. Zhumatiy et al., "Metric State Space Reinforcement Learning for a Vision-Capable Mobile Robot," Technical Report; IDSIA; Mar. 2006.

Ricci et al., "Acquiring and Revising Preferences in a Critique-Based Mobile Recommender System," May/Jun. 2007, vol. 22, No. 3, IEEE Computer Society, Copyright 2007 IEEE.

T. Blackwell, "Fast Decoding of Tagged Message Formats," Proceeding IEEE INFOCOM '96, Mar. 24-28, 1996, Copyright 1996 IEEE, pp. 224-231.

International Search Report; International Application No. PCT/US11/23557; International Filing Date: Feb. 3, 2011; Date of Mailing: Apr. 4, 2011.

International Search Report-Written Opinion; International Application No. PCT/US11/23557; International Filing Date: Feb. 3, 2011; Date of Mailing: Apr. 4, 2011.

Non-Final Office Action dated Mar. 15, 2012 for U.S. Appl. No. 12/718,041.

Bae et al., "TagReel: A Visualization of Tag Relations among User Interests in the Social Tagging System", 2009 Six International Conference on Computer Graphics, Imaging and Visualization, IEEE Computer society, 2009, pp. 437-442.

Hosy, Marc, Indexing/Labeling?Enhancing digital pictures using Voice Tags/Commands/Comments, www.ip.com, IP.com electronicl IPCOM000169425D; Publication Apr. 22, 2008; pp. 1-3.

\* cited by examiner

| User Table | |
|---|---|
| User ID | |
| U1 | |
| U2 | |
| U3 | |

| Subscription Table | | | | |
|---|---|---|---|---|
| User ID | Service ID | Last Interaction | Last message ID | Last Parameter ID |
| U1 | S1 | 1-1-01 0500 | M1 | P0 |
| U1 | S2 | 1-2-01 0900 | M1 | P1 |
| U2 | S1 | 1-5-01 1000 | M1 | P1 |
| U3 | S2 | 1-6-01 1100 | M2 | P2 |

| Service Table | | |
|---|---|---|
| Service ID | Service Name | Cycle Time |
| S1 | Reminder | 30 |
| S2 | Weather | 14 |

| Service Parameter Table | |
|---|---|
| Service ID | Parameter ID |
| S1 | P1 |
| S2 | P1 |
| S2 | P2 |

| User Preference Table | | |
|---|---|---|
| User ID | Parameter ID | Value ID |
| U1 | P1 | V3 |
| U1 | P2 | V6 |
| U2 | P1 | V3 |
| U2 | P2 | V4 |

| Preference History Table | |
|---|---|
| User ID | Value ID |
| U1 | V1 |
| U1 | V2 |
| U1 | V6 |
| U2 | V1 |
| U2 | V2 |
| U3 | V3 |

| Preference Probability Table | |
|---|---|
| Value ID | Probability |
| V1 | 0.3 |
| V2 | 0.2 |
| V3 | 0.5 |
| V4 | 0.3 |
| V5 | 0.5 |
| V6 | 0.2 |

| Value Table | | | |
|---|---|---|---|
| Value ID | Parameter ID | Setting | Value |
| V1 | P1 | Morning | 0600 |
| V2 | P1 | Afternoon | 1100 |
| V3 | P1 | Night | 1600 |
| V4 | P2 | Infrequent | 4320 |
| V5 | P2 | Ocasional | 2820 |
| V6 | P2 | Frequent | 1440 |
| V7 | P3 | News | 0 |
| V8 | P3 | Weather | 1 |
| V9 | P4 | Near | 0 |
| V10 | P4 | Far | 50 |

| Message Data Table | | |
|---|---|---|
| Message ID | Message Data | Service ID |
| M1 | Brush your teeth | S1 |
| M2 | 73 degrees and sunny | S2 |
| M3 | 30 Degrees and snowy | S2 |

DATA SESSION PREFERENCES

BACKGROUND

The present invention relates to sending and receiving data over a phone network, and more specifically, to data sessions using mobile communications devices.

Though the functions of available mobile telephone devices continue to advance, there are significant numbers of users who utilize mobile telephone devices with limited functions or features. For example, millions of mobile telephone device users use simple mobile telephone devices with voice and texting/short message service (SMS), but with limited alternative communications features.

Mobile phone services accessible through voice and SMS often have parameters controlling their operation. Further, users of these services have preferences regarding the setting of these parameters. However, preferences may be difficult, costly, or lengthy for users to specify because of the limited input capabilities of simple mobile devices.

BRIEF SUMMARY

According to one embodiment of the present invention, a method includes receiving a request from a user device for a service, initializing the service, initializing a user preference based on a parameter associated with the service and a preference probability value, the preference probability value including a probability that a user would prefer a particular value as a preference based on values selected by other users, and sending data to the user device according to the user preference.

According to another embodiment of the present invention, a system includes a user device, and a processor operative to receive a request from the user device for a service, initialize the service, initialize a user preference based on a parameter associated with the service and a preference probability value, the preference probability value including a probability that a user would prefer a particular value as a preference based on values selected by other users, and send data to the user device according to the user preference.

According to yet another embodiment of the prevent invention, a non-transitory computer-readable storage medium including computer executable instructions that, when executed on a processor of a computer apparatus, direct the processor to perform a method for dynamically adjusting a hardware event counting time-slice window, the method including receiving a request from a user device for a service, initializing the service, initializing a user preference based on a parameter associated with the service and a preference probability value, the preference probability value including a probability that a user would prefer a particular value as a preference based on values selected by other users, and sending data to the user device according to the user preference.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In many mobile telephone service areas, some users may, in addition to utilizing voice features, use texting or SMS features, but may not use other data services due to device or network limitations, or the cost of wireless data transmission over the networks or cost of the capable devices. The illustrated embodiments described below allow a user to interact with a server in a session to perform a variety of tasks using text messaging or voice messaging features. Though the illustrated embodiments describe texting or SMS services, one of ordinary skill in the art would understand that any type similar messaging service including voice messaging, which may be in some embodiments converted to textual messages or processed with voice recognition methods, or e-mail and instant messaging, may be used in a similar manner as described below.

Figure 1:
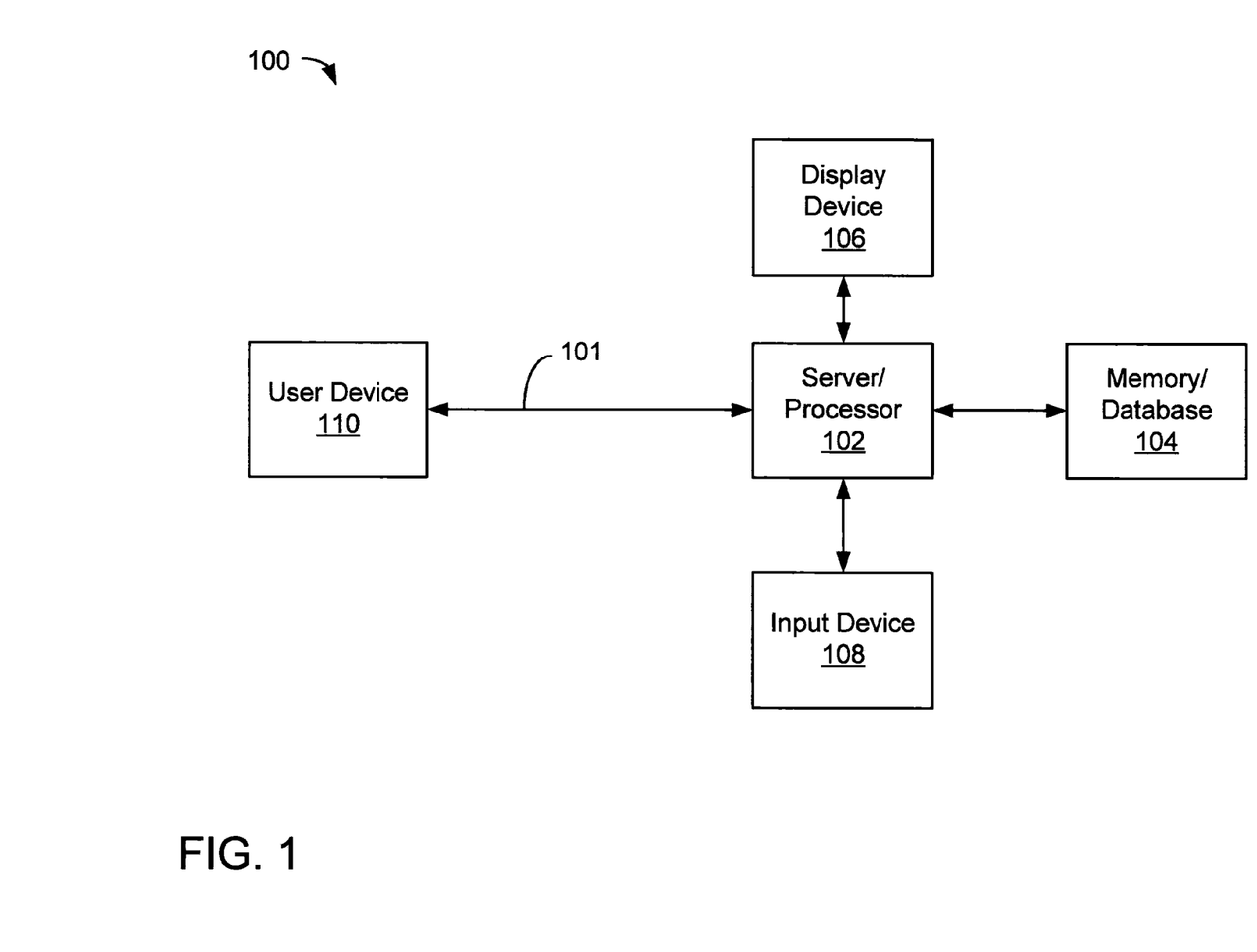
FIG. 1 illustrates an exemplary embodiment of a system.

FIG. 1 illustrates an exemplary embodiment of a system 100. The system 100 includes a server or processor 102 that is communicatively connected to a memory or database 104, a display device 106, and an input device 108. The server 102 is communicatively connected to a user device 110 that may include, for example, a mobile phone or other type of user device via a communications network 101. The user device 110 may include, for example, a keypad, processor, display, and a wireless communications portion. Though the illustrated embodiment includes one user device 110, the system 100 may include any number of user devices 110. The server 102 is operative to receive messages sent from the user device 110. For example, the user device may send a message to the server 102 by addressing the message to a particular phone number. The server 102 receives the message.

Figure 2A:
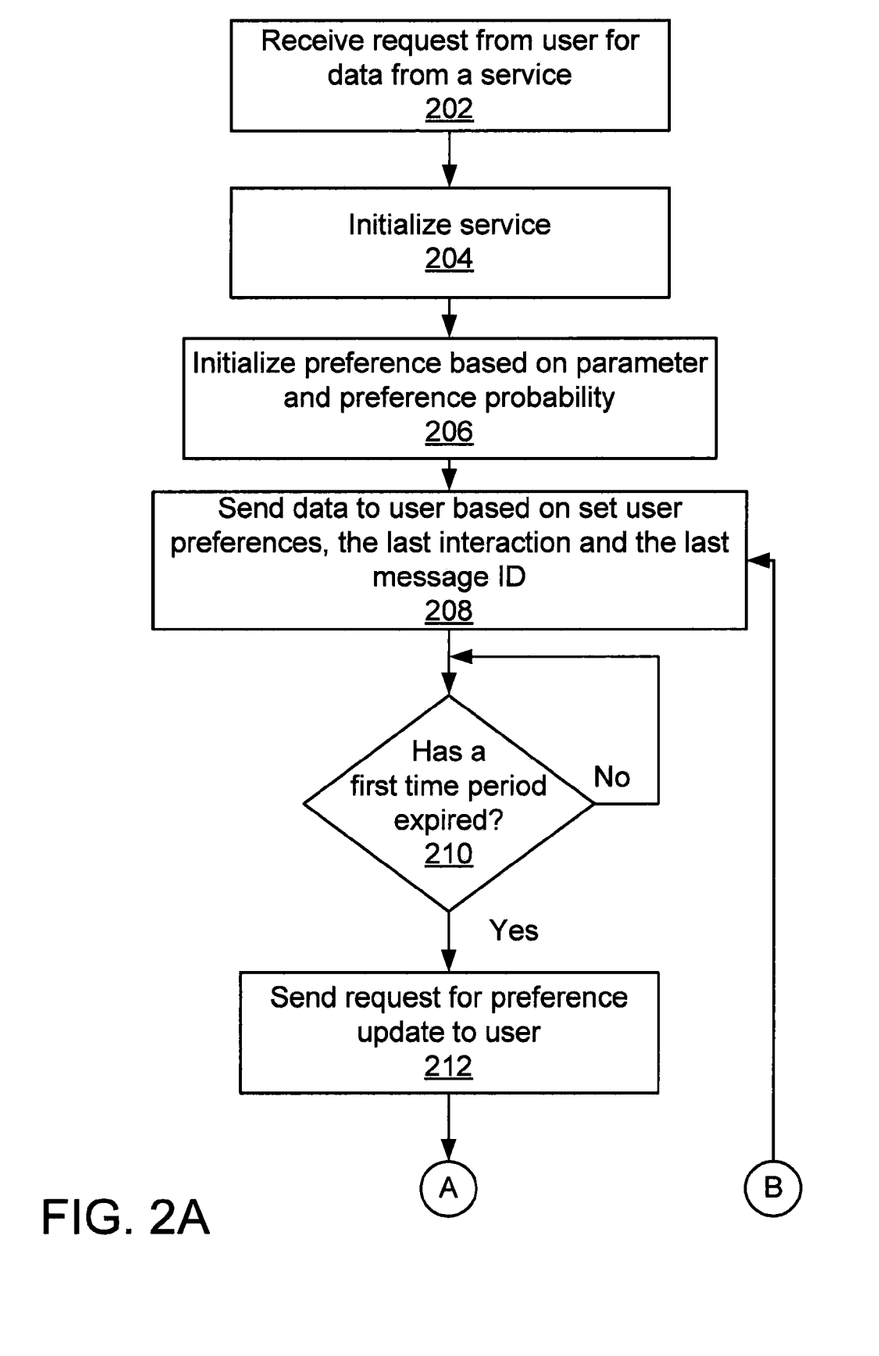
FIGS. 2A and 2B illustrate a block diagram of an exemplary method.
Figure 2B:
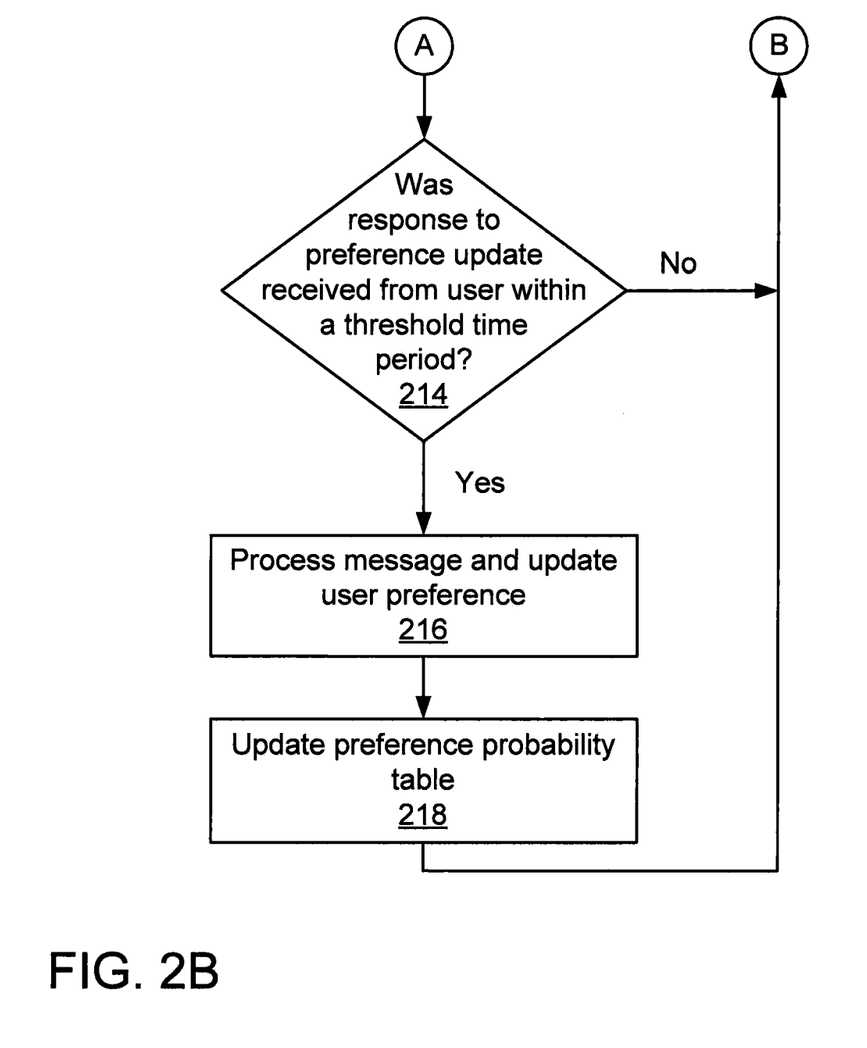
Figure 3:
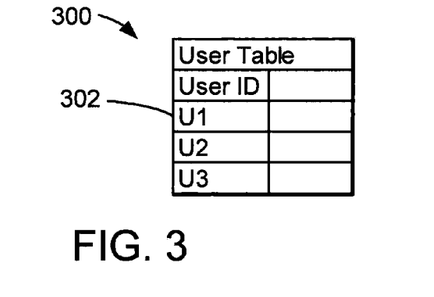
FIG. 3 illustrates a user table.
Figure 4:
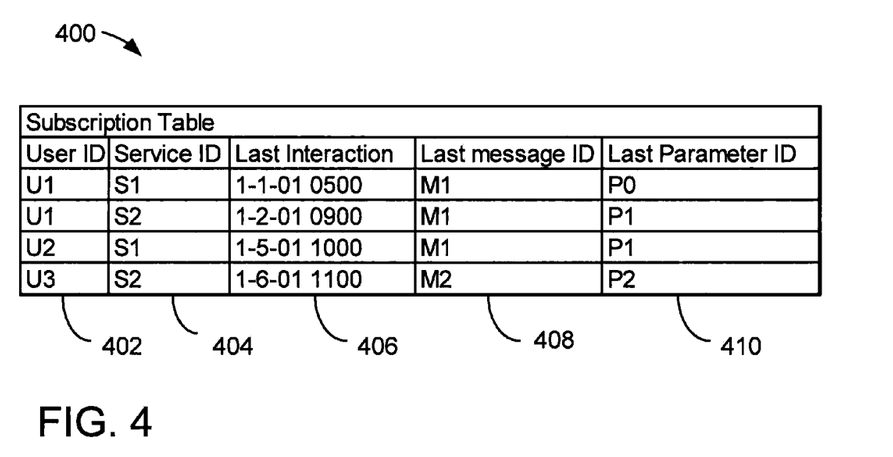
FIG. 4 illustrates a subscription table.
Figure 5:
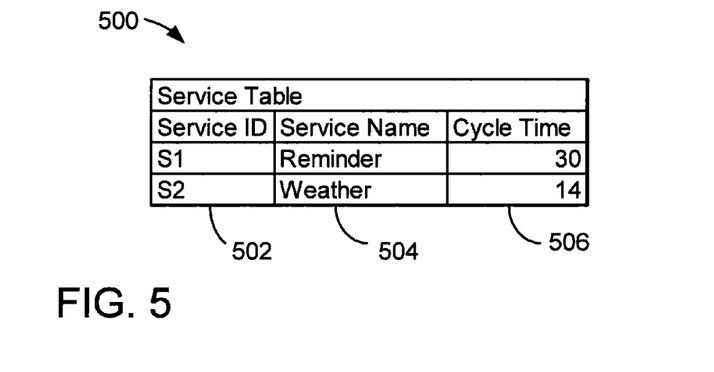
FIG. 5 illustrates a service table.

FIGS. 2A and 2B illustrate a block diagram of an exemplary method. FIGS. 3-11 illustrate tables that may be stored in the database 104. The tables will be described in further detail below. In this regard, referring to FIG. 2A, in block 202, a request is received from the user device 110 for a service. The request includes, an identifier of the sender or user device 110, an identifier of the recipient (e.g., a phone number associated with the service; or other recipient address), and in some embodiments, an identifier of the service. The service table 500 (of FIG. 5) includes a service ID field 502; a service name field 504; and a cycle time field 506. When a request is received by the server 102, the server 102 determines the identifier of the user, which may include for example, a phone number associated with the user device 110 or another unique identifier of the user such as an email address. If the identifier of the user (user ID) is not saved in the user table 300 (of FIG. 3), the server 110 saves the user ID in the user ID field 302 of the user table 300. The server 110 identifies the service associated with the request and saves the user ID and a service identifier (service ID) associated with the requested service in the subscription table 400 (of FIG. 4). The request may in some instances, include one or more parameter IDs and corresponding settings as a set of initial preferences. The subscription table 400 includes a user ID field 402; a service ID 404 field; a last interaction 406 field; a last message ID field 408; and a last parameter ID field 410.

In block 204 (of FIG. 2A) the service is initialized using parameters associated with the user ID and the service that are retrieved from the tables and the request. The last interaction field 406 is initialized with the time the request was received. The last message ID field 408 is initialized (to zero). The last parameter ID field 410 is initialized to P0 (no parameter). If one or more parameter IDs and corresponding settings are provided in the request, these are set into table 700.

Figure 6:
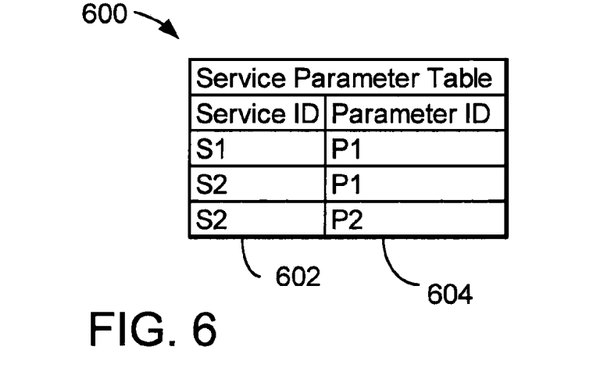
FIG. 6 illustrates a service parameter table.
Figure 10:
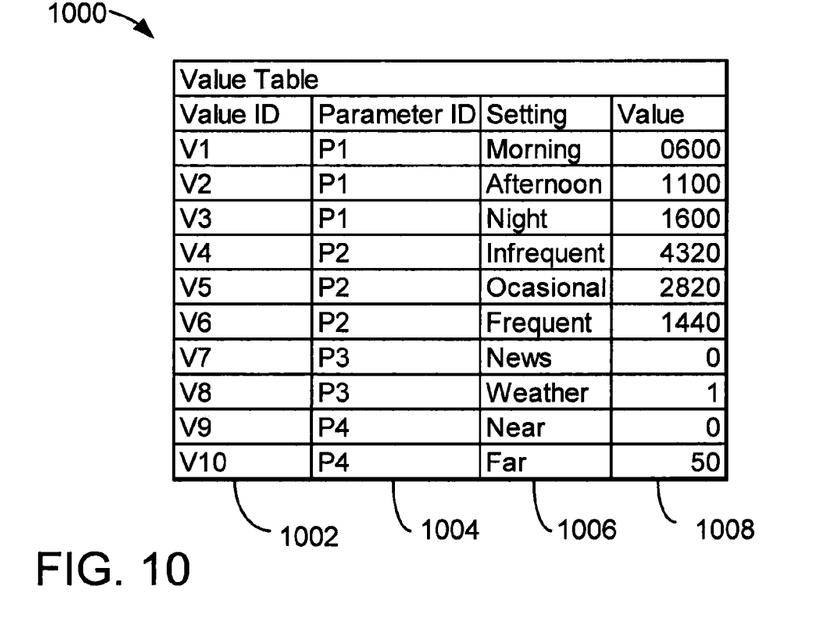
FIG. 10 illustrates a value table.

If the last Parameter ID is its initial value, P0, in the table 400 with the user ID and service ID, the server 102 will initialize preferences for the user that are associated with the service based on preference probabilities in block 206. In this regard, FIG. 6 includes a service parameter table 600 that includes a service ID field 602; and a parameter ID field 604. The table 600 allows the server 110 (of FIG. 1) to identify and retrieve parameters associated with a service. FIG. 10 includes a value table 1000. The value table 1000 includes a value ID field 1002, a parameter ID field 1004, a setting field 1006, and a value field 1008. The table 1000 allows the server 110 to identify and retrieve values associated with the retrieved parameter ID.

Figure 7:
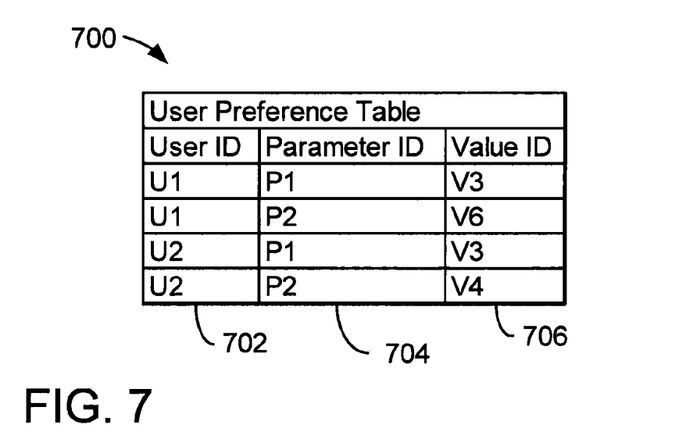
FIG. 7 illustrates a user preference table.
Figure 9:
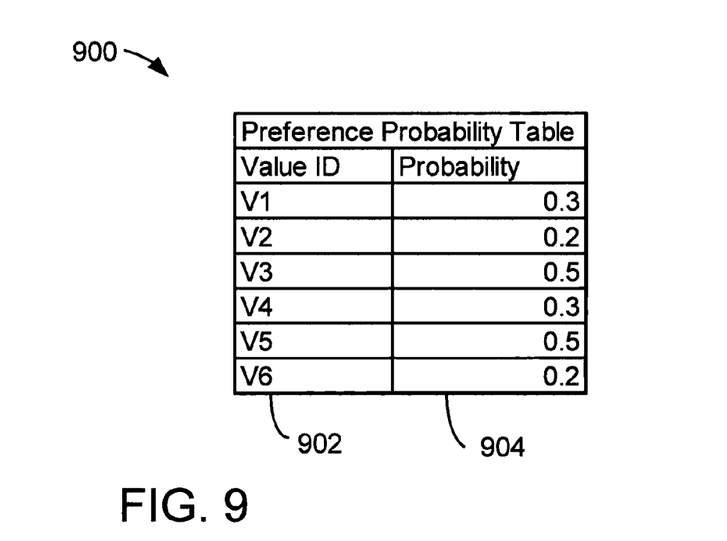
FIG. 9 illustrates a preference probability table.

FIG. 9 includes a preference probability table 900, which includes a value ID field 902 and a probability field 904. Once the value ID(s) associated with the parameter ID have been retrieved from table 1000, the server 110 uses the probability table 900 to identify which of the retrieved values has the highest probability (e.g., out of the retrieved values V1, V2, and V3; V3 has the highest probability of 0.5). FIG. 7 includes a user preference table 700 that includes a user ID field 702, a parameter ID field 704, and a value ID field 706. The server 102 enters the user ID, retrieved parameter ID, and the identified value ID from the probability table 900 into the preference history table 800.

The probability table 900 (of FIG. 9) includes the probability that a user would prefer a particular value as a preference based on the values selected by other users or updated by the server when the other users requested the service. For example, referring to FIG. 9, the V1, V2, and V3, value IDs are associated with a parameter P1 (as associated in table 1000 of FIG. 10). The table 900 includes probabilities of 0.3, 0.2, and 0.5 respectively. Thus, thirty percent of the users prefer V1, twenty percent of the users prefer V2, and fifty percent of the users prefer V3. The probability table 900 allows the server 102 to set a preference value for a parameter and user based on the probability that the user would select a particular value given the preferences of other users. Thus, the value chosen will have a greater probability of being selected by the user based on previous selections by other users. The illustrated embodiments include an exemplary method for determining preference probabilities of users. One skilled in the art would understand that the probabilities may be determined by any number of alternate methods.

Figure 11:
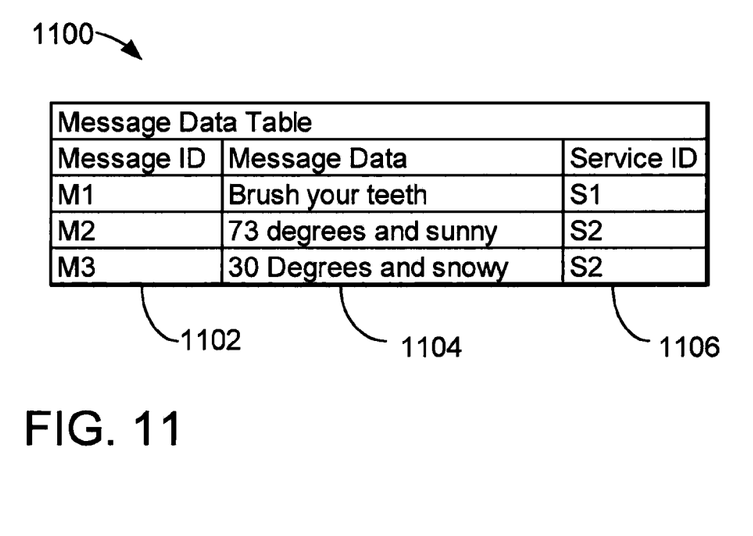
FIG. 11 illustrates message data table.

Referring to FIG. 2A, in block 208, data is sent to the user based on the set user preferences. The data may include data retrieved from the message data table 1100 (of FIG. 11) that includes a message ID field 1102; a message data field 1104; and a service ID field 1106. The subscription table 400 (of FIG. 4) is updated accordingly (the last Interaction and last Message ID are set).

In block 210, the server 102 determines whether a first time period has expired. The time period may be particular to the service or generally implemented by the server 102. The time period allows for the user to interact with the service to determine if their user preferences are set desirably, however, in some embodiments it may be desirable for the first time period to be equal to zero. Once the time period has expired, the server 102 sends a request for a preference update message to the user device 110. The request message may include, for example, a parameter associated with the service, and a value of the parameter (e.g., your weather updates are being sent in the afternoon). The request message may ask a user for feedback regarding whether the value of the parameter is correct or should be different (e.g., earlier or later, more or less frequent, a different category of information, nearer or farther).

In block 214, the server 102 determines whether the server 102 has received a response to the preference update message from the user device 110 within a threshold time period that includes feedback with an indicator of a preference. If no, the server 102 will send data to the user device 110 based on set user preferences as defined in the user preference table 700 (of FIG. 7) in block 208. If yes, the response to the preference update message is processed and the user preference table is updated in block 216.

In this regard, the indicator of preference may include, for example, "higher," "lower," "later," "earlier," "OK,", "yes", "no" or other similar relative or discrete terms, words, phrases, or other textual indicators of the preference. Alternatively, the preference may include a parameter, for example, "wakuptime earlier". Natural language processing methods could be used to extract a parameter or an indicator of preference or both from a message containing natural language text. Also, a parameter may able to be inferred from the value. For example, if the value is "later" then the "time" parameter can be selected. One parameter and/or value may be indicated in a message or multiple parameters and/or their associated values may be indicated in a message.

Figure 8:
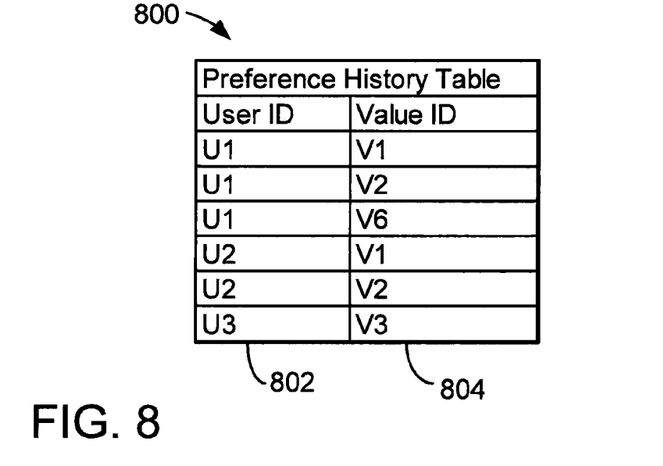
FIG. 8 illustrates a preference history table.

When the indicator of preference is received, the server 102 retrieves the last parameter (as above) and then retrieves the prior preferences of the user from the preference history table 800 (of FIG. 8). The server 102 then retrieves the ordered set of all of the values from the value table 1000 (of FIG. 10) for the last parameter. The server 102 subtracts the prior preferences of the user from the ordered set of all values, resulting in an ordered set of unexplored values. The server 102 selects the value with the highest probability from the probability table 900 amongst the unexplored values. The server 102 then changes the user preference table 700 (of FIG. 7) to set a different value ID to the user ID and parameter ID. If the user ID and value ID pair do not already appear in the preference history table 800, the server 102 then adds the user ID and Value ID to the Preference History Table 800.

For example, if the values are the hours between 1 pm and 10 pm and the retrieved user preference is 7 pm and indicator is "greater" but the server 102 has already explored preferences for 10 pm and 11 pm prior, then the indicated values would be 8 pm and 9 pm and if 9 pm had a greater probability than 8 pm, it would select the value 9 pm. In some embodiments, the server 102 may select a value by successive approximation. For example, if the parameter is ordered (e.g., time, distance), the server 102 may select a value half way between the highest probability value and the current user preference. The server 102 then changes the user preference table 700 (of FIG. 7) to set a different value ID to the user ID and parameter ID. If the user ID and value ID pair do not already appear in the preference history table 800, the server 102 then adds the user ID and Value ID to the Preference History Table 800.

If there are no remaining values to explore for this parameter, the server 102 moves to the next parameter ID. The server 102 uses the preference history table 800, the service parameter table 600, and the value table 1000 (of FIG. 10) to determine which parameters have not had all of their preferences (values) probed/explored. The server 102 iterates through the parameters from the service parameters table 600 (of FIG. 6), then looks up the values in the values table 1000. The server 102 then retrieves the values from the preference history table 800. Once a value is found that does not appear in the preference history table 800, the server 102 returns that parameter ID as the next parameter ID. If no such next parameter ID is found, then the server 102 chooses a default next parameter ID according to the sequential order of the service parameters table 600. If there are none (all of the parameters have been explored), then the server 102 sets the last parameter ID to P0, no parameter. Once the next parameter is determined, it is stored in the last parameter ID field in the subscriptions table 400 (of FIG. 4).

In the exemplary method the parameters are listed so that if a parameter is dependent in some way on the setting of the earlier parameter, then it is listed after the earlier parameter. For example, setting a preferred cuisine might be done after selecting a city so that cuisines specific to the city may be selected. However, there are a number of different ways one might order the parameters. In some cases multiple parameter preferences may be determined.

The preference history table 800 may be updated in block 218 using an exemplary method described below in FIG. 12.

Figure 12:
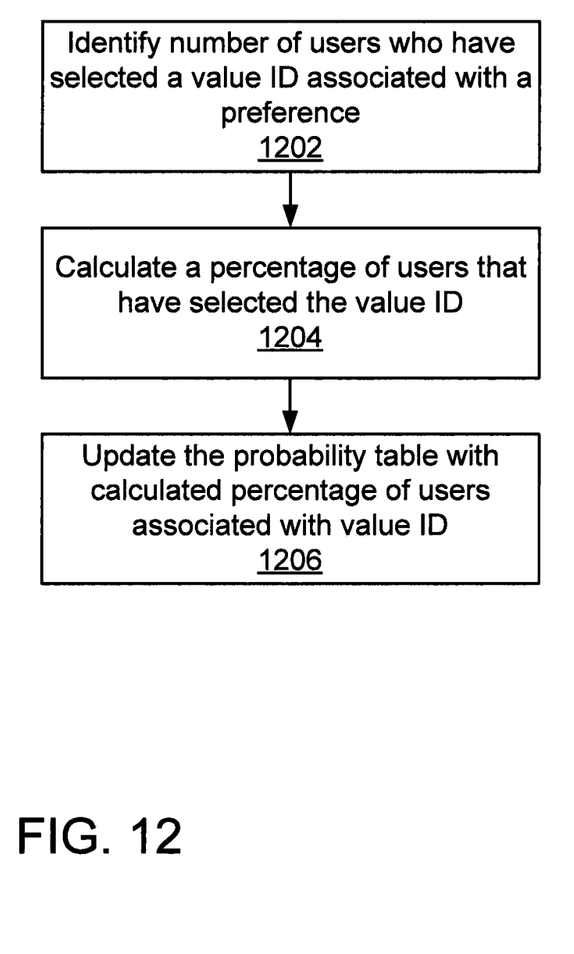
FIG. 12 illustrates a block diagram of an exemplary method for populating the preference probability table.

FIG. 12 illustrates a block diagram of an exemplary method for populating the preference probability table 900 (of FIG. 9) In this regard, FIG. 8 illustrates a preference history table 800 that includes a user ID field 802 and a value ID field 804. Referring to FIG. 12, in block 1202, a number of users who have selected a value ID associated with a preference are identified in the preference history table 800. In block 1204, the percentage of users who have selected the value ID is calculated. The probability field 904 of the probability table 900 is updated with the calculated percentage of users in block 1206.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method comprising:
   receiving a request from a user device for a service;
   initializing the service;
   initializing a user preference based on a parameter associated with the service and a preference probability value, the preference probability value including a probability that a user would prefer a particular value as a preference based on values selected by other users; and
   sending data to the user device according to the user preference;
   wherein the method further comprises calculating a percentage of users that have selected a value ID associated with the parameter associated with the service and updating a probability table to include the preference probability value associated with the calculated percentage.

2. The method of claim 1, wherein the method further comprises:
   determining whether a first time period has expired; and
   sending a request for a preference update message to the user device responsive to determining that the first time period has expired.

3. The method of claim 2, wherein the method further includes:
   determining whether a response to the preference update message including an indicator of a preference setting has been received from the user device within a threshold time period;
   updating the user preference to a preference associated with the indicator responsive to determining that the second time period has not expired.

4. The method of claim 3, wherein the indicator includes a textual entry entered by the user, the textual enter including an indicator of a desired change in the preference setting relative to a current preference setting.

5. The method of claim 2, wherein the method further includes ignoring a response to the preference update message including an indicator of a preference setting responsive to determining that the response to the preference update message including an indicator of a preference setting has been not received from the user device within the threshold time period.

6. The method of claim 1, wherein the method further includes saving a time the data associated with the preference is sent to the user.

7. A system comprising:
   a user device; and
   a processor operative to receive a request from the user device for a service, initialize the service, initialize a user preference based on a parameter associated with the service and a preference probability value, the preference probability value including a probability that a user would prefer a particular value as a preference based on values selected by other users, and send data to the user device according to the user preference;
   wherein the processor is further operative to calculate a percentage of users that have selected a value ID associated with the parameter associated with the service and updating a probability table to include the preference probability value associated with the calculated percentage.

8. The system of claim 7, wherein the processor is further operative to determine whether a first time period has expired, and send a request for a preference update message to the user device responsive to determining that the first time period has expired.

9. The system of claim 8, wherein the processor is further operative to determine whether a response to the preference update message including an indicator of a preference setting has been received from the user device within a threshold time period, and update the user preference to a preference associated with the indicator responsive to determining that the second time period has not expired.

10. The system of claim 9, wherein the processor is further operative to ignore a response to the preference update message including an indicator of a preference setting responsive to determining that the response to the preference update message including an indicator of a preference setting has been not received from the user device within the threshold time period.

11. The system of claim 9, wherein the indicator includes a textual entry entered by the user, the textual enter including an indicator of a desired change in the preference setting relative to a current preference setting.

12. The system of claim 7, wherein the processor is further operative to save a time the data associated with the preference is sent to the user.

13. A non-transitory computer-readable storage medium including computer executable instructions that, when executed on a processor of a computer apparatus, direct the processor to perform a method for dynamically adjusting a hardware event counting time-slice window, the method comprising:
receiving a request from a user device for a service;
initializing the service;
initializing a user preference based on a parameter associated with the service and a preference probability value, the preference probability value including a probability that a user would prefer a particular value as a preference based on values selected by other users; and
sending data to the user device according to the user preference;
wherein the method further comprises calculating a percentage of users that have selected a value ID associated with the parameter associated with the service and updating a probability table to include the preference probability value associated with the calculated percentage.

14. The method of claim 13, wherein the method further comprises:
determining whether a first time period has expired; and
sending a request for a preference update message to the user device responsive to determining that the first time period has expired.

15. The method of claim 14, wherein the method further includes:
determining whether a response to the preference update message including an indicator of a preference setting has been received from the user device within a threshold time period;
updating the user preference to a preference associated with the indicator responsive to determining that the second time period has not expired.

16. The method of claim 15, wherein the indicator includes a textual entry entered by the user, the textual enter including an indicator of a desired change in the preference setting relative to a current preference setting.

17. The method of claim 14, wherein the method further includes ignoring a response to the preference update message including an indicator of a preference setting responsive to determining that the response to the preference update message including an indicator of a preference setting has been not received from the user device within the threshold time period.

* * * * *